US007194681B1

United States Patent
Horvitz

(10) Patent No.: US 7,194,681 B1
(45) Date of Patent: Mar. 20, 2007

(54) METHOD FOR AUTOMATICALLY ASSIGNING PRIORITIES TO DOCUMENTS AND MESSAGES

(75) Inventor: Eric Horvitz, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 280 days.

(21) Appl. No.: 09/364,527

(22) Filed: Jul. 30, 1999

(51) Int. Cl.
*G06F 17/00* (2006.01)

(52) U.S. Cl. .................... 715/514; 707/7; 709/207; 709/240

(58) Field of Classification Search ............. 707/514, 707/7; 709/207, 240, 103; 715/514
See application file for complete search history.

(56) References Cited

U.S. PATENT DOCUMENTS

| 5,377,354 | A | * | 12/1994 | Scannell et al. ............ 709/103 |
| 5,493,692 | A | | 2/1996 | Theimer et al. |
| 5,694,616 | A | * | 12/1997 | Johnson et al. ............. 709/207 |
| 5,864,848 | A | | 1/1999 | Horvitz |
| 5,974,465 | A | * | 10/1999 | Wong ........................ 709/234 |
| 6,021,403 | A | | 2/2000 | Horvitz |
| 6,182,059 | B1 | * | 1/2001 | Angotti et al. ............... 706/45 |
| 6,185,603 | B1 | * | 2/2001 | Henderson et al. .......... 709/206 |
| 6,282,565 | B1 | * | 8/2001 | Shaw et al. ................. 709/206 |
| 6,327,581 | B1 | * | 12/2001 | Platt .............................. 706/12 |
| 6,424,995 | B1 | * | 7/2002 | Shuman ...................... 709/206 |
| 6,442,589 | B1 | * | 8/2002 | Takahashi et al. ........... 709/203 |

FOREIGN PATENT DOCUMENTS

WO    WO 98/00787    1/1998

OTHER PUBLICATIONS

Cohen, "Learning Rules that Classify E–Mail", 1996 (as disclosed at http://www–2.cs.cmu.edu/~wcohen/pubs–t.html).*
Lewis, "Evaluating and Optimizing Autonomous Text Classification Systems", 1995 ACM.*
Lewis, David, "Training Algorithms for Linear Text Classifiers", AT&T Laboratories, 1996.*
Apte, Chidanand, Fred Damerau, and Sholom M. Weiss, "Automated Learning of Decision Rules for Text Categorization", 1994 ACM.*
International Search Report dated Aug. 29, 2003, for International Application Ser. No. PCT/US00/20685.
Robert M. Losee Jr., "Minimizing information overload: the ranking of electronic messages", Received Jul. 18, 1988, Revised Nov. 8, 1988, pp. 179–189.
Thorsten Joachims, "Text Categorized with Support Vector Machines: Learning with Many Relevent Features", 1998, 6 pages.

(Continued)

*Primary Examiner*—Joseph Feild
*Assistant Examiner*—Rachna Singh
(74) *Attorney, Agent, or Firm*—Amin & Turocy, LLP

(57) ABSTRACT

Methods for prioritizing documents, such as email messages, is disclosed. In one embodiment, a computer-implemented method first receives a document. The method assigns a measure of priority to the document, by employing a text classifier such as a Bayesian classifier or a support-vector machine classifier. The method then outputs the priority. In one embodiment, the method includes alerting the user about a document, such as an email message, based on the expected loss associated with delays expected in reviewing the document as compared to the expected cost of distraction and transmission incurred with alerting the user about the document.

1 Claim, 13 Drawing Sheets

OTHER PUBLICATIONS

J. Breese, D. Heckerman, & C. Kadie (1998). Empirical Analysis of Predictive Algoirthms for Collaborative Filtering. In Proceedings of the Fourteenth Conference on Uncertinaty in Artificial Intelligence, pp. 43–52. AUAI, Morgan Kaufmann, San Francisco.

M. Czerwinski, S. Dumais, G. Robertson, et al. (1999). Visualizing implicit queries for information management and retrieval. In Proceedings of CHI '99, ACM SIGCHI Conference on Human Factors in Computing Systems, Pittsburgh, PA, pp. 560–567. Association for Computing Machinery.

S. Dumais, J. Platt, D. Heckerman, M. Sahami (1998). Inductive learning algorithms and representations for text categorization. In Proceedings of the Seventh International Conference on Information and Knowledge Management, pp. 148–155. Association for Computing Machinery, ACM Press, New York.

E. Horvitz (1999). Principles of mixed–initiative user interfaces. In Proceedings of CHI '99, ACM SIGCHI Conference on Human Factors in Computing Systems, Pittsburgh, PA, pp. 159–166. Association for Computing Machinery.

E. Horvitz, M. Barry (1995). Display of information for time–critical decision making. In Proceedings of the Eleventh Conference on Uncertinaty in Artificial Intelligence, pp. 296–305 Montreal, Canada. Morgan Kaufmann, San Francisco.

E. Horvitz, J. Breese, D. Heckerman, D. Hovel, K. Rommelse (1998). The Lumiere project: Bayesian user modeling for inferring the goals and needs of software users. In Proceedings of the Fourteenth Conference on Uncertainty in Artificial Intelligence, pp. 256–265. Morgan Kaufman, San Francisco.

E. Horvitz and G. Rutledge (1991). Time–dependent utility and action under uncertainty. In Proceedings of Seventh Conference on Uncertainty in Artificial Intelligence, Los Angeles, CA, pp. 151–158. Morgan Kaufmann, San Francisco.

E. Horvitz and A. Seiver (1997). Time–critical action: Representations and application. In Proceedings of the Thirteenth Conference on Uncertainty in Artificial Intelligence (UAI–97), pp. 250–257 Providence, RI. Morgan Kaufmann, San Francisco.

D. Koller, M. Sahami (1996). Toward optimal feature selection. In Proceedings of Thirteenth Conference on Machine Learning, pp. 284–292, Morgan Kaufmann, San Francisco.

H. Leiberman (1995). An agent that assist web browsing. In Proceedings of IJCAI–95, Montreal Canada. Morgan Kaufmann, San Francisco.

J. Platt (1999). Fast training of support vector machines using sequential minimal optimzation. In Advances in Kernal Methods: Support Vector Learning. MIT Press, Cambridge, MA.

J. Platt (1999). Proobabilistic outputs for support vector machines and comparison to regularized likelihood methods. In Advances in Large Margin Classifiers, MIT Press, Cambridge, MA.

M. Sahami, S. Dumais, D. Heckerman, E. Horvitz (1998). A Bayesian approach to filtering junk e–mail. In Workshop on Learning for Text Categorization, AAAI Technical Report WS–98–05. American Association for Artificial Intelligence, AAAI.

U.S. patent application Ser. No. 09/007,894, Horvitz, filed Jan. 15, 1998.

U.S. patent application Ser. No. 09/055,477, filed Apr. 6, 1998.

* cited by examiner

METHOD FOR AUTOMATICALLY ASSIGNING PRIORITIES TO DOCUMENTS AND MESSAGES

RELATED APPLICATIONS

This application is related to the cofiled, copending and coassigned applications entitled "Integration of a Computer-Based Message Priority System with Mobile Electronic Devices" Ser. No. 09/365,293, "Methods for Routing Documents based on a Measure of Criticality" Ser. No. 09/364,528, "Methods for Display, Notification, and Interaction with Prioritized Messages" Ser. No. 09/364,522, and "A Computational Architecture for Managing the Transmittal and Render of Information, Alerts, and Notifications" Ser. No. 09/365,287.

FIELD OF THE INVENTION

This invention relates generally to text documents such as email messages, and more particularly to the prioritization of such documents by measures of importance, including a measure of importance that cast as an urgency and, more specifically, as an urgency defined as the expected cost of delayed review of the document

BACKGROUND OF THE INVENTION

Electronic mail programs have become a popular application among computer users. Especially with the advent of the Internet, exchanging email has almost become a reason why people purchase computers for personal reasons, and within many corporate environments, email has become the standard manner by which coworkers exchange information. However, with the increasing popularity of email, shortcomings have become apparent.

Chief among these shortcomings is that many users now face a deluge of email every day, such that the capability of being able to send and receive email has almost become a hindrance to their day-to-day ability to get their job done, as opposed to being an asset. Some users report receiving over 100 email messages a day. With such large numbers of email, it is difficult to manage the email, such that the users read the most important messages first.

Limited solutions to this problem have been attempted in the prior art. Prior art exists for attempting to curtail the amount of junk email—e.g., unsolicited email, typically regarding a service or product for sale—that users receive. Moreover, some electronic mail programs allow for the generation of rules that govern how an email is managed within the program—for example, placing all emails from certain coworkers in a special folder.

These limited solutions, however, do not strike at the basic problem behind email—that with so much email being received, it would be most useful for a user to be able to have his or her computer automatically prioritize the email by importance or review urgency, and perform actions based on that prioritization. For these and other reasons, there is a need for the present invention.

SUMMARY OF THE INVENTION

The invention relates to prioritizing text such as email messages. In one embodiment, a computer-implemented method first receives a text. The method generates a priority of the text, based on a text classifier such as a Bayesian classifier or a support-vector machine classifier. The method then outputs the priority. In one embodiment, the user is alerted based on a cost-benefit analysis of alerting, considering the priority of a given message. That is, in one embodiment, the method includes alerting the user based on an expected loss of now-review of the text as compared to an expected cost of alerting the user of the text, at a current time.

Embodiments of the invention provide for advantages over the prior art. A user, for example, in one embodiment, may ask that he or she only be disturbed or alerted if the priority of the text is greater than a given threshold. Thus, even if the user receives over 100 different emails, he or she will be alerted to the most important email, and then will be able to deal with the other email when the user has time. Prioritization, in other words, makes email much more useful in environments where a lot of email is exchanged on a regular basis.

Embodiments of the invention include computer-implemented methods, computer-readable media, and computerized systems of varying embodiments. Still other embodiments, advantages and aspects of the invention will become apparent by reading the following detailed description, and by reference to the drawings.

BRIEF DESCRIPTION OF THE DRAWINGS

FIG. 4($b$) is a diagram of another scheme according to which the priority of a text can be classified, according to another embodiment of the invention;

FIG. 5($b$) is a graph showing a non-linear cost function for a text, according to an embodiment of the invention;

DETAILED DESCRIPTION OF THE INVENTION

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. (It is noted that the terms document and text are used interchangeably herein and should be construed as interchangeable as well.)

It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as processing or computing or calculating or determining or displaying or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Operating Environment

Figure 1:
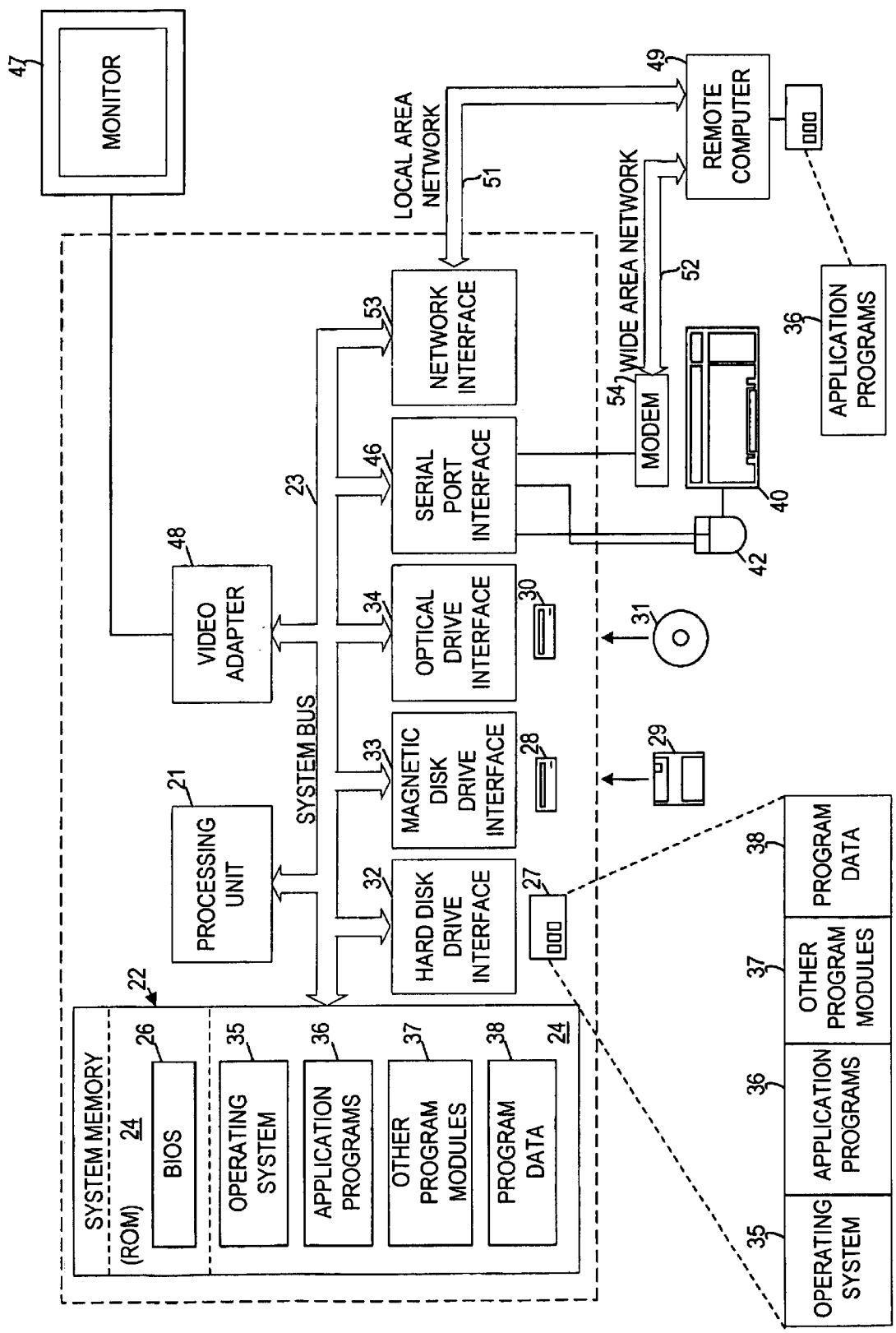
FIG. 1 is a diagram of an operating environment in conjunction with which embodiments of the invention may be practiced.

Referring to FIG. 1, a diagram of the hardware and operating environment in conjunction with which embodiments of the invention may be practiced is shown. The description of FIG. 1 is intended to provide a brief, general description of suitable computer hardware and a suitable computing environment in conjunction with which the invention may be implemented. Although not required, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PC's, minicomputers, mainframe computers, and the like. The invention may also be practiced in distributed computing environments where tasks are performed by remote processing devices that are linked through a communications network. In a distributed computing environment, program modules may be located in both local and remote memory storage devices.

The exemplary hardware and operating environment of FIG. 1 for implementing the invention includes a general purpose computing device in the form of a computer 20, including a processing unit 21, a system memory 22, and a system bus 23 that operatively couples various system components include the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 1. The logical connections depicted in FIG. 1 include a local-area network (LAN) 51 and a wide-area network (WAN) 52. Such networking environments are commonplace in office networks, enterprise-wide computer networks, intranets and the Internal, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52, such as the Internal. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

Generating Measures for Prioritization of Text Documents

In this section of the detailed description, the generation of a priority for text documents such as an email, according to one embodiment of the invention, is described. The generation of priorities for texts as described can then be used in methods, systems, and computer-readable media (as well as other embodiments) of the invention as are presented in other sections of the detailed description. The description in this section is provided in conjunction with FIG. 2 and FIG. 3, the former which is a diagram showing explicit and implicit training of a text classifier, according to an embodiment of the invention, and the latter which is a diagram showing how a priority for a text is generated by input to a text classifier, according to an embodiment of the invention. The description is also provided in conjunction with FIGS. 4(a) and 4(b), which are diagrams of different schema according to which the priority of a text can be classified, and in conjunction with FIGS. 5(a) and 5(b), which are graphs showing different cost functions that may be applicable depending on text type.

Figure 2:
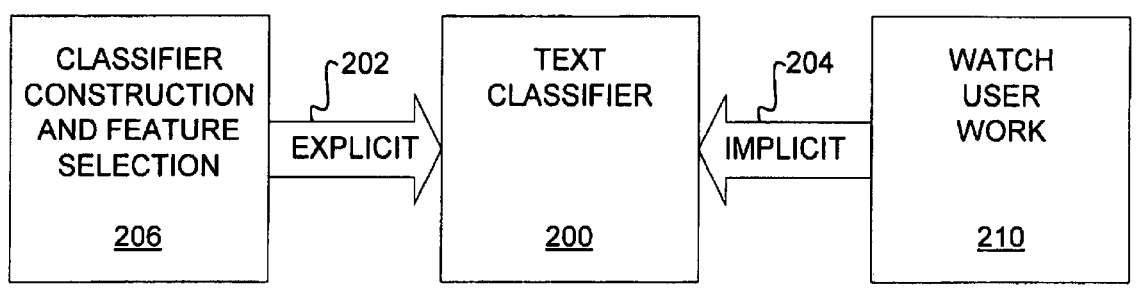
FIG. 2 is a diagram showing explicit and implicit training of a text classifier, according to an embodiment of the invention.

Referring first to FIG. 2, the text classifier 200 is able to be trained both explicitly, as represented by the arrow 202, and implicitly, as represent by the arrow 204. The explicit training represented by the arrow 202 is usually conducted at the initial phases of constructing the text classifier 200, while the implicit training represented by the arrow 204 is usually conducted after the text classifier 200 has been constructed, to fine tune the classifier 200. However, the invention is not so limited.

The text classifier 200 in one embodiment is a Bayesian classifier, as known within the art, while in another embodiment it is a support vector machine (SVM) classifier, as also known within the art. Text classification methodology based on a Bayesian learning approach is specifically described in the reference M. Sahami, S. Dumais, D. Heckerman, E. Horvitz, A Bayesian Approach to Junk E-Mail Filtering, AAAI Workshop on Text Classification, July 1998, Madison, Wis., AAAI Technical Report WS-98-05, which is hereby incorporated by reference. Text classification methodology based on an SVM approach is specifically described in the following references: the coassigned patent, U.S. Pat. No. 5,864,848, issued Jan. 26, 1999, which is hereby incorporated by reference; the previously filed and coassigned case entitled "Methods and Apparatus for Building a Support Vector Machine Classifier," Ser. No. 09/055,477, filed on Apr. 6, 1998, which is also hereby incorporated by reference; and, the reference J. Platt, Fast Training of Support Vector Machines using Sequential Minimal Optimization, MIT Press, Baltimore, Md., 1998, which is also hereby incorporated by reference. For purposes of this application, specific description is made with reference to an SVM classifier, although those of ordinary skill within the art can appreciate that the invention is not so limited. Other text classification approaches include Bayesian networks, decision trees, and probabilistic classification models assuming different patterns of independence. Text classification as used herein also is inclusive of statistical regression that is used to develop models of priority.

As shown in FIG. 2, the explicit training of the text classifier 200 as represented by the arrow 202 includes constructing the classifier in 206, including utilizing feature selection. In general, Support Vector Machines build classifiers by identifying a hyperplane that separates a set of positive and negative examples with a maximum margin. In the linear form of SVM that is employed in one embodiment, the margin is defined by the distance of the hyperplane to the nearest positive and negative cases for each class. Maximizing the margin can be expressed as an optimization problem. A post-processing procedure described in the Platt reference is used that employs regularized maximum likelihood fitting to produce estimations of posterior probabilities. The method fits a sigmoid to the score that is output by the SVM classifier.

In the explicit training, the text classifier is presented with both time-critical and non-time-critical texts (e.g., email messages), so that it may be able to discriminate between the two. This training set may be provided by the user, or a standard training set may be used. Given a training corpus, the text classifier first applies feature-selection procedures that attempt to find the most discriminatory features. This process employs a mutual-information analysis. Feature selection can operate on single words or higher-level distinctions made available, such as phrases and parts of speech tagged with natural language processing—that is, the text classifier 200 is able to be seeded with specially tagged text to discriminate features of a text that are considered important.

Feature selection for text classification typically performs a search over single words. Beyond the reliance on single words, domain-specific phrases and high-level patterns of features are also made available. Special tokens can also enhance classification. The quality of the learned classifiers for email criticality can be enhanced by inputting to the feature selection procedures handcrafted features that are identified as being useful for distinguishing among email of different time criticality. Thus, during feature selection, single words as well as special phrases and symbols that are useful for discriminating among messages of different levels of time criticality are considered.

Tokens and patterns of value in identifying the criticality of messages include such distinctions as (including Boolean combinations thereof):

Information in the Header
  To: field (Recipient information)
    Addressed just to user
    Addressed to only a few people including user
    Addressed to an alias with a small number of people
    Addressed to several aliases with a small number of people
    Cc:'d to user
    Bcc:'d to user
  From: field (Sender information)
    Names on pre-determined list of important people, potentially segmented into a variety of classes of individuals, e.g., Family members, Friends
    Senders identified as internal to the user's company organization
    Information about the structure of organizational relationships relative to the user drawn from an online organization chart
      Managers user reports to
      Managers of the managers of users
      People who report to the user
    External business people
Past tense
  These include descriptions about events that have already occurred such as:
    We met
    meeting went
    happened
    got together
    took care of
    meeting yesterday
Future tense
  Tomorrow
  This week
  Are you going to
  When can we
  Looking forward to
  Will this
  Will be
Meeting and coordination
  Get together
  Can you meet
  Will get together
  Coordinate with
  Need to get together
  See you
  Arrange a meeting
  Like to invite
  Be around
  [these should all be lower case—Word is uppercasing things]
Resolved dates
  Future vs. past dates and times indicated from patterns of text used to state dates and times explicitly or typical abbreviations
  On 5/2
Questions
  Words, phrases adjacent to questions marks ?

Indications of personal requests:
  Can you
  Are you
  Will you
  you please
  Can you do
  Favor to ask
  From you
Indications of need:
  I need
  He needs
  She needs
  I'd like
  It would be great
  I want
  He wants
  She wants
  Take care of
Time criticality
  happening soon
  right away
  deadline will be
  deadline is
  as soon as possible
  needs this soon
  to be done soon
  done right away
  this soon
  by [date]
  by [time]
Importance
  is important
  is critical
  Word, phrase+!
  Explicit priority flag status (low, none, high)
Length of message
  Number of bytes in component of new message
Signs of Commercial and Adult-Content Junk email
  Free!!
  Word+!!!
  Under 18
  Adult's only
  Percent of capitalized words
  Percent nonalphanumeric characters
  etc.

Other features that may be used for feature selection are described in the cofiled, copending and coassigned application entitled "A Computational Architecture for Managing the Transmittal and Render of Information, Alerts, and Notifications" Ser. No. 09/365,287, which is hereby incorporated by reference, and in the copending and coassigned application entitled "Methods and Apparatus for Building a Support Vector Machine Classifier," Ser. No. 09/055,477, filed on Apr. 6, 1998, which has already been incorporated by reference.

Furthermore, still referring to FIG. 2, implicit training of the text classifier 200, as represented by the arrow 204, can be conducted by continually watching the user work in 210. The assumption is that as users work, and lists of mail are reviewed, time-critical messages are read first, and low-priority messages are reviewed later, or just deleted. That is, when presented with a new email, the user is watched to determine whether or she immediately opens the email, and in what order (if more than one new email are present), deletes the email without opening, and/or replies to the email right away. Thus, the text classifier is such that a user is continually watched while working, and the classifier is periodically refined by training in the background and updated for enhancing the real-time decision making. Background methods for building classifiers can extend from those that update the classifier with every new training message.

Other embodiments gather larger quantities of messages and create new filters in a batch process, either per a daily schedule, per the number of new quantities of messages admitted to the training set, or combinations. For each message inputted into the classifier, a new case for the classifier is created. The cases are stored as negative and positive examples of texts that are either high or low priority. Those of ordinary skill within the art understand that the invention is not limited to the use of two classes. We can store and train to recognize low, medium, and high urgency classes and use the probabilities of membership in each of these classes to build an expected criticality. We can use larger numbers of criticality classes to seek higher resolution. Also, we can attempt to simply estimate a number directly by watching a user interact with email—rather than labeling the case as one of a specific small set of folders. We can further continue to update a classifier but have a moving window, where we only consider cases of messages or documents that are newer than some age, specified by the user.

In one embodiment, we refer to the constant rate of loss associated with the delayed review of messages as the expected criticality (EC) of a message, $$EC = \sum_i C^d(H_i) p(H_i \mid E^d)$$

where C is a cost function, E is an event, H is the criticality class of the email, and the EC is the sum over the likelihood of the classes weighted by the rate of lost described by the cost function C for each of the potential classes.

Figure 3:
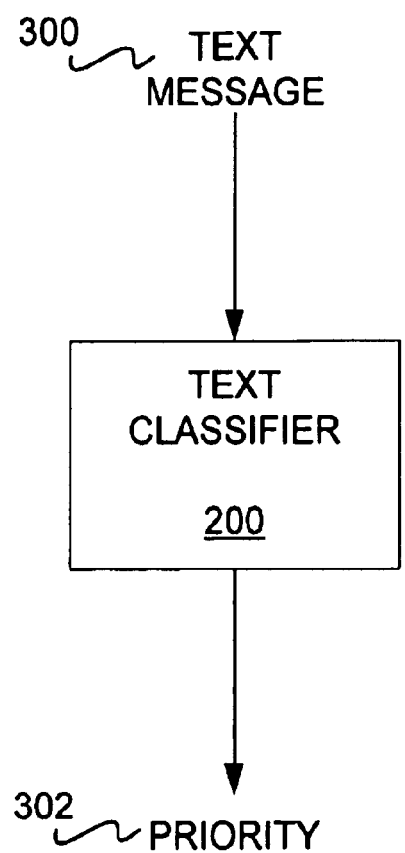
FIG. 3 is a diagram showing how a priority for a text is generated by input to a text classifier, according to an embodiment of the invention.
Figure 4A:
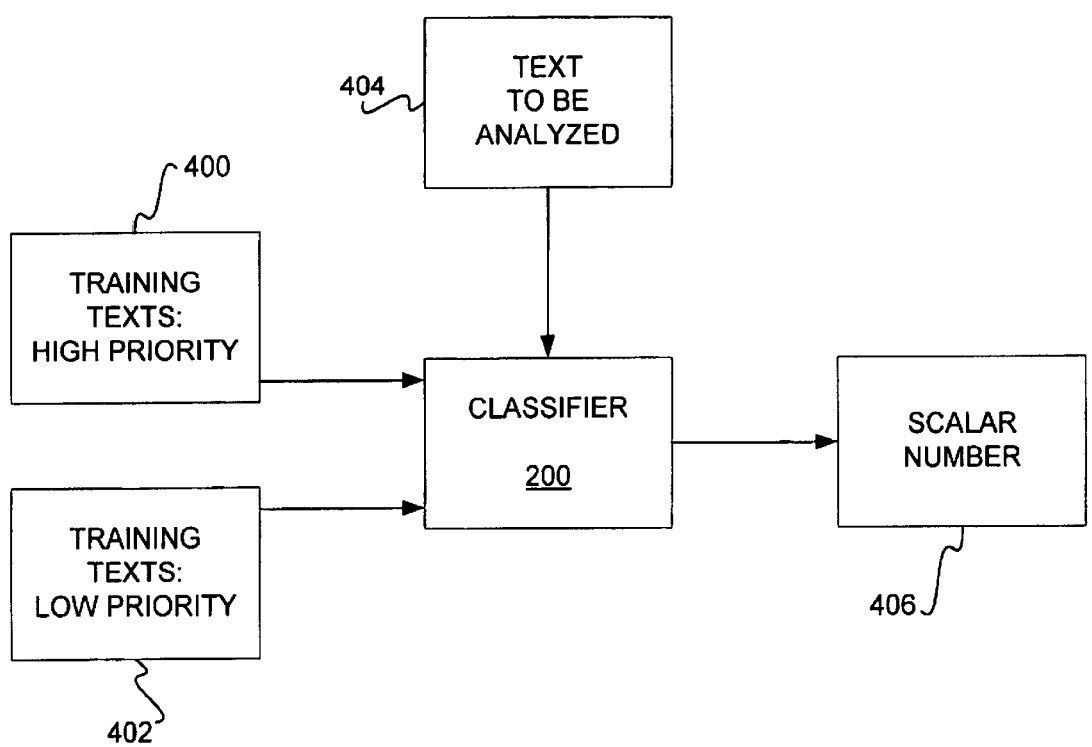
FIG. 4($a$) is a diagram of a scheme according to which the priority of a text can be classified, according to an embodiment of the invention.

Referring next to FIG. 3, a text, such as an email message, 300 is input into the text classifier 200, which based thereon generates a priority 302 for the text 300. That is, in one embodiment, the text classifier 200 generates a priority 302, measured as a percentage from 0 to 1 (i.e., 0% to 100%). This percentage is a measure of the likelihood that the text 300 is of high priority, based on the previous training of the classifier 200.

It is noted that as has been described, the text classifier and the priority generated thereby is based on a scheme where each email in the training phase is construed as either high priority or low priority, such that the priority generated by the text classifier is a measure of the likelihood of the text being analyzed is of high priority. This scheme is specifically shown by reference to FIG. 4(a), where the text classifier 200 is trained by a group of texts 400 that are high priority and a group of texts 402 that are low priority, such that a text to be analyzed 400 is input into the classifier 200, which outputs a scalar number 406 measuring the likelihood that the text being analyzed is of high priority. However, those of ordinary skill within the art can appreciate that the invention is not so limited.

Figure 4B:
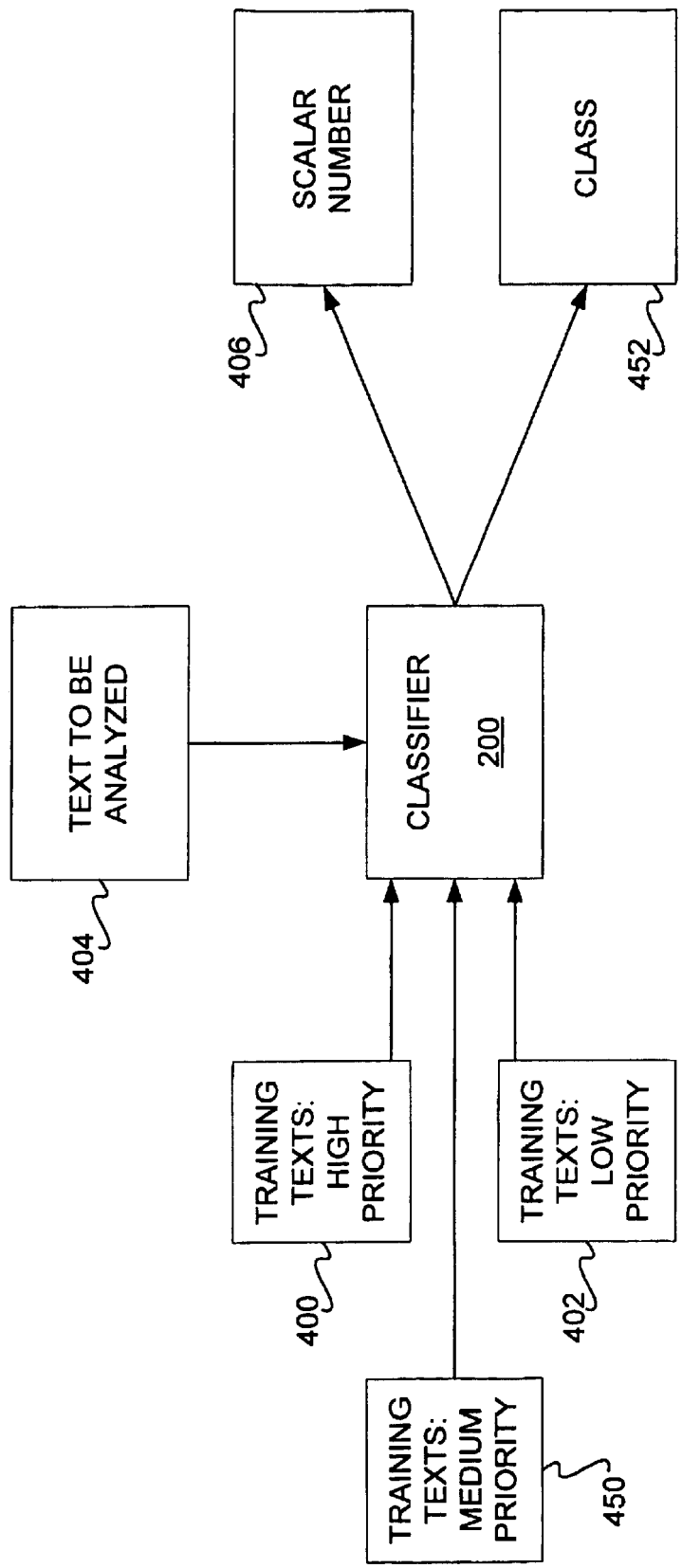

For example, referring to FIG. 4(b), a diagram showing a scheme where texts are divided into low, medium and high priority, according to an embodiment of the invention, is shown. The text classifier 200 in the embodiment of FIG. 4(b) is trained by a group of texts 400 that are high priority and a group of texts 402 that are low priority, as in the previous embodiment, but also by a group of texts 450 that are medium priority. Thus, a text to be analyzed 400 is input into the classifier 200, which outputs a scalar number 406, that can measure the likelihood that the text being analyzed is of high priority, if so desired, or medium priority or low priority. The classifier 200 is also able to output a class 452, which indicates the class of low, medium or high priority that the text 404 most likely falls into. Those of ordinary skill within the art can appreciate that further classes can also be added if desired.

The invention is not limited to the definition of priority as this term is used by the text classifier to assign such priority to a text such as an email message. In one embodiment, however, priority is defined in terms of a loss function. More specifically, priority is defined in terms of the expected cost in lost opportunities per time delayed in reviewing the text after it has be received—that is, the expected lost or cost that will result for delayed processing of the text. This loss function can further vary according to the type of text received.

Figure 5A:
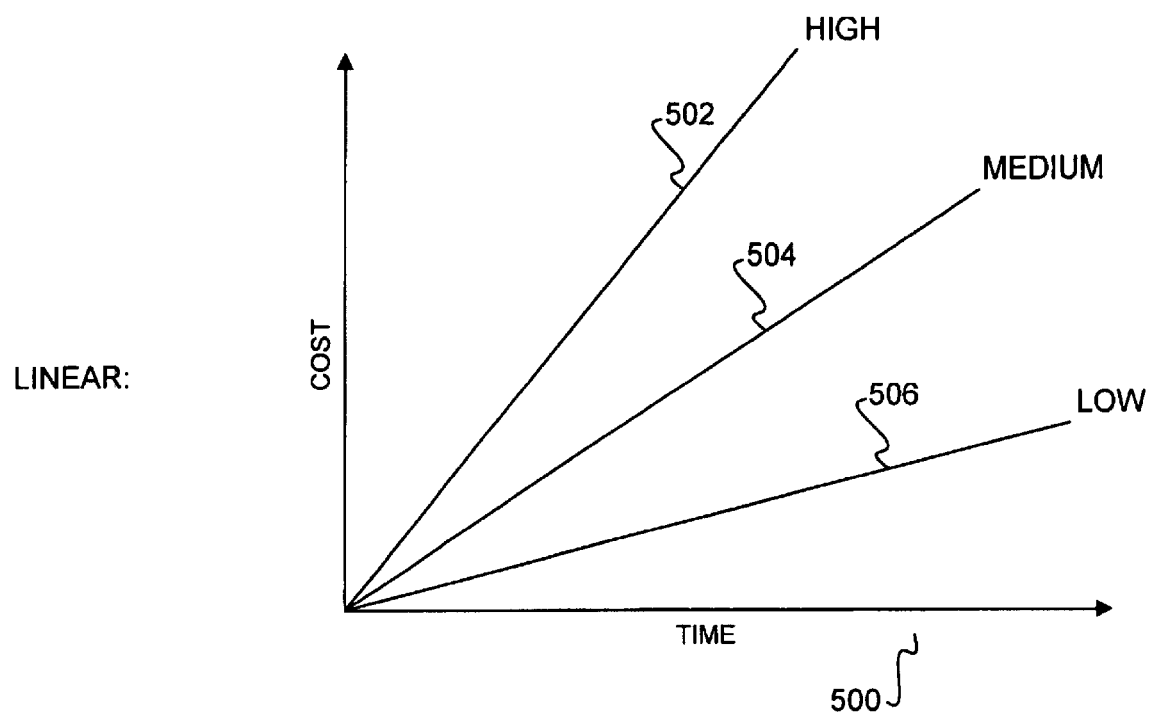
FIG. 5($a$) is a graph showing linear cost functions of high, medium and low priority texts, according to an embodiment of the invention.

For example, the general case is shown in FIG. 5(a), which is a graph of linear cost functions dependent on the priority of a text. In the graph 500, as time increases, the cost of not having reviewed a text also increases. However, the cost increases more for a high priority message, as indicated by the line 502, as compared to a medium priority message, as indicated by the line 504, or a low priority message, as indicated by the line 506. That is, the high priority line 502 may have a slope of 100, the medium priority line 504 may have a slope of 10, and the low priority line 502 may have a slope of 1. These slope values can then be used by the text classifier to assist in assigning a priority to a given text, for example, by regression analysis.

Figure 5B:
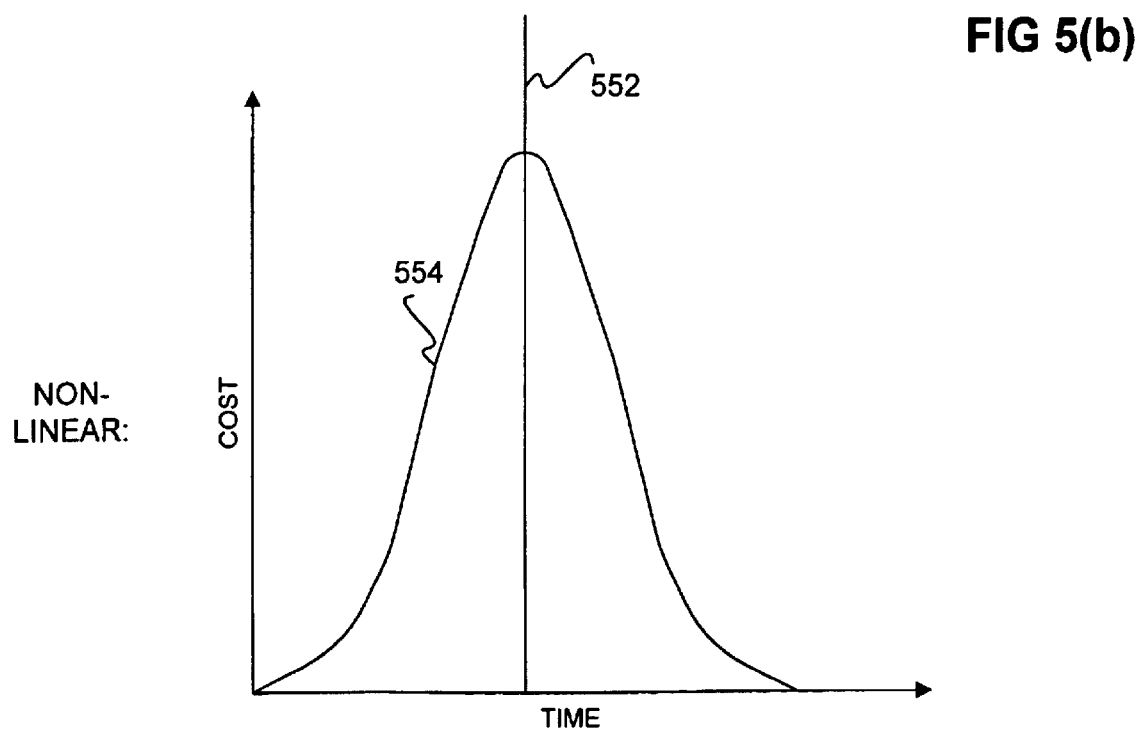

Some messages, however, do not have their priorities well approximated by the use of a linear cost function. For example, a message relating to a meeting will have its cost function increase as the time of the meeting nears, and thereafter, the cost function rapidly decreases—since after the meeting is missed, there is not much generally a user can do about it. This situation is better approximated by a non-linear cost function, as shown in FIG. 5(b). In the graph 550, the cost function 554 rapidly increases until it reaches the time of the meeting demarcated by the line 552, after which it rapidly decreases. Thus, those of ordinary skill within the art can appreciate that depending on a message's type, the cost function can be approximated by one of many different representative cost functions, both linear and non-linear.

Thus, as has been described, the priority of a text can be just the likelihood that it is of high priority based on output of a text classifier, or the most likely priority class (i.e., medium, low or high priority) it falls into, also based on the output of the text classifier. However, in another embodiment of the invention, an expected time criticality of each text, such as an email message, is determined. This can be written as $$EL = \sum_i^n p(critical_i) C(critical_i)$$

where EL is the expected loss, $p(critical_i)$ is the probability that a text has the criticality i (e.g., where i=0 may be low priority and i=1 may be high priority, or where i=0 may be low priority, i=1 medium priority and i=2 high priority, etc.), $C(\text{critical}_i)$ is the cost function for text having the criticality i, and n is the total number of criticality classes minus one. The cost functions may be linear or non-linear, as has been described—in the case where the function are linear, the cost function defines a constant rate of loss with time. For non-linear functions, the rate of loss changes with delayed review or processing of the text and can increase or decrease, depending on the amount of delay.

In the case where n=1, specifying that there are only two priority classes low and high, the expected loss can be reformulated as $$EC = p(\text{critical}_{high})C(\text{critical}_{high}) + [1-p(\text{critical}_{low})]C(\text{critical}_{low})$$

where EC is the expected criticality of a text. Furthermore, if the cost function of low criticality messages is set to zero, this becomes $$EC = p(\text{critical}_{high})C(\text{critical}_{high})$$

The total loss until the time of review of a text can be expressed as the integration of the pressed criticality, or, $$EL = \int_0^t p(\text{critical}_{high})C(\text{critical}_{high}, t) dt$$

where t is the time delay before reviewing the document.

It is noted that in other embodiments of the invention, other measures that accord a valuable metric for ranking documents, such as email messages, by importance. While the discussion above focused on priority as time criticality, other notions of "importance" can also be trained—for example, by labeling a set of training folders: "High Importance" all the way down to "Low Importance" a measure of "expected importance" can be computed. Another metric can be based on the use of the semantic label, "messages that I would wish to hear about within 1 day while traveling" and to compute an measure for prioritizing messages for forwarding to traveling user.

Furthermore, in one embodiment, a utilized metric is urgency or time-criticality (based on the assignment of an "expected rate of accruing cost with delayed review of documents) as it has clear semantics for decision making, triage, and routing. In this case, the classes are labeled according to different levels of urgency and compute an expected urgency for each message from the probabilities inferred that the message is in each class.

Determining When to Alert the User

In this section of the detailed description, described is provided as to determining when to alert the user of a high-priority text, for example, a text that has a likelihood of being high priority greater than a user-set threshold, or greater than a threshold determined by decision-theoretic reasoning. That is, beyond knowing about time-critical messages, it is also important in one embodiment to decide when to alert a user to time-critical messages if the user is not directly viewing incoming email (in one embodiment). In the general case, a cost of distracting the user from the current task being addressed to learn about the time-critical message is determined.

In different embodiments of the invention, different policies for alerting and notification can be used. Two policies include:

Put a user-specified upper bound on the total loss—this policy would specify that the system should generate an alert when the total loss associated with the delayed review of a message exceeds some pre-specified "tolerable" loss x.

Another policy is a cost-benefit analysis based on more complete decision-theoretic analysis, such as NEVA= EVTA−ECA−TC, where NEVA is the net expected value of alerting, EVTA is the expected value of alerting, ECA is the expected cost of alerting, and TC is the transmission cost.

In general, a user should be alerted when a cost-benefit analysis suggests that the expected loss the user would incur in not reviewing the message at time t is greater than the expected cost of alerting the user. That is, alerting should be conducted if $$EL - EC > 0$$

where EL is the expected loss of non-review of the text at a current time t, and EC is the expected cost of alerting the user of the text at the current time t. The expected loss is as described in the previous section of the detailed description.

However, this formulation is not entirely accurate, because the user will often review the message on his or her own at some point in the future anyway. Therefore, in actuality, the user should be alerted when the expected value of alerting, referred to as EVTA, is positive. The expected value of alerting should thus consider the value of alerting the user of the text now, as opposed to the value of the user reviewing the message later on his or her own, without alert, minus the cost of alerting. This can be stated as $$EVA = EL_{alert} - EL_{no-alert} - EC$$

where $EL_{alert}$ is the expected loss of the user reviewing the message if he or she were to review the message now, upon being alerted, as opposed to $EL_{no-alert}$, which is the expected loss of the user reviewing the message on his or her own at some point, without being alerted, minus EC, the expected cost of alerting (now) based on a consideration of distraction and on the direct cost of the transmitting the information (for a mobile system).

Furthermore, in one specific embodiment of the invention, information from several messages are grouped together into a single compound alert. Reviewing information about multiple messages in an alert can be more costly than an alert relaying information about a single messages. Such increases in distraction can be represented by making the cost of an alert a function of its informational complexity. It is assumed that the EVA of an email message is independent of the EVA of the other email messages. $EVA(M_i, t)$ is used to refer to the value of alerting a user about a single message $M_i$ at time t and $ECA(n)$ is used to refer to the expected cost of relaying the content of n messages. Thus, multiple messages can be considered by summing together the expected value of relaying information about a set of n messages, $$NEVA = \sum_{i=1} EVA(M_i, t) - ECA(n).$$

In one embodiment of the invention, it is noted that determining when to alert the user is conducted in accordance with the more rigorous treatment of EVA described in the copending, cofiled and coassigned application entitled "A Computational Architecture for Managing the Transmittal and Render of Information, Alerts, and Notifications" Ser. No. 09/365,287, which is hereby incorporated by reference. However, the invention is not so limited.

It is also noted that in order to determine the expect cost of alerting, it is useful to infer or directly access information about whether the user is present—and therefore can see or hear alerts from the computer—or is not present. Sensors can be used in one embodiment that indicate when a user is in the office, such as infrared sensors, pressure sensors (on the chair), etc. However, if such devices are not available, a probability that a user is in the office can be assigned as a function of user activity on the computer, such as the time since last observed mouse or keyboard activity. Furthermore, scheduling information available in a calendar can also be made use of to make inferences about the distance and disposition of a user, to consider the costs of forwarding messages to the user by different means (e.g., cell phone, pager, etc.).

Figure 6:
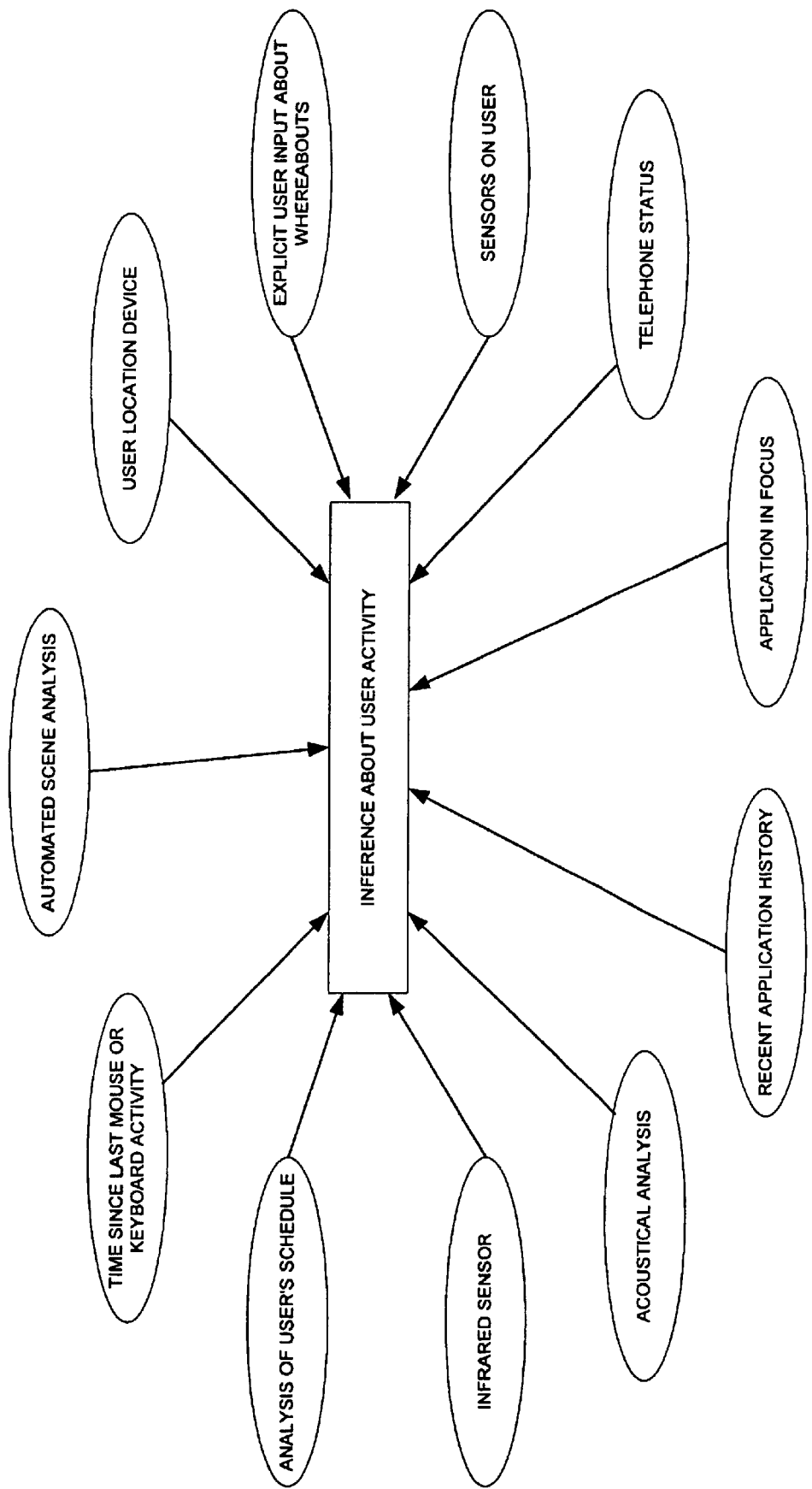
FIG. 6 is a diagram showing classes of evidence that can be used to make an inference about a user's activity (e.g., if a user is present), according to one embodiment of the invention.
Figure 7:
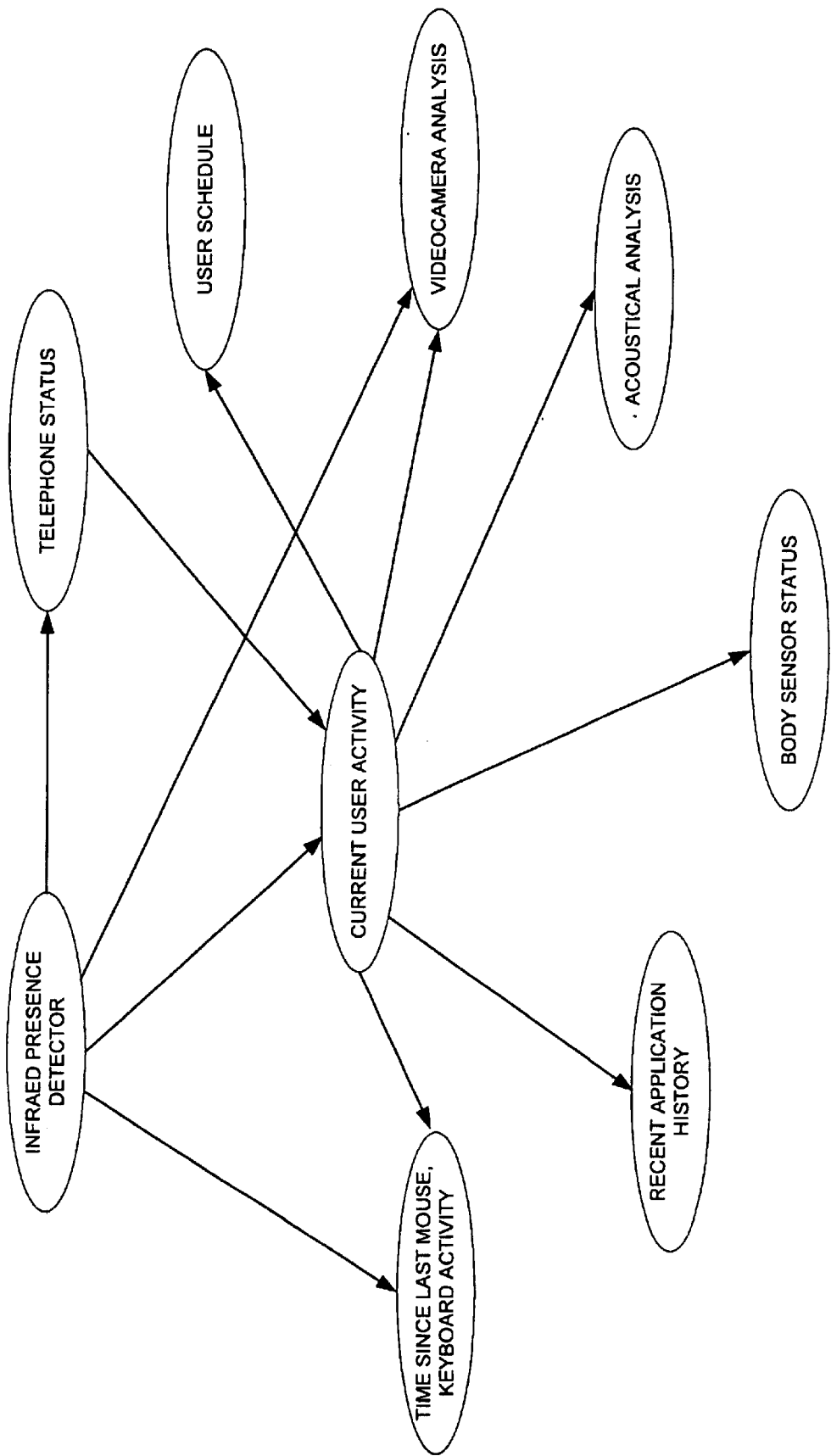
FIG. 7 is a diagram showing a Bayesian network that can be used for inferring a user's activity (e.g., if a user is present), according to one embodiment of the invention.

It is also important to know how busy the user is in making decisions about interrupting the user with information about messages with high time criticality. In one embodiment, it is reasoned about whether and the rate at which a user is working on a computer, or whether the user is on the telephone, speaking with someone, or at a meeting at another location. In one embodiment, several classes of evidence can be used to asses a user's activity or his or her focus of attention, as shown in FIG. 6. A Bayesian network, as known in the art, can then be used for performing an inference about a user's activity; an example of such a network is shown in FIG. 7. Utilizing evidence to infer whether the user is present is described more rigorously in the cofiled, copending and coassigned application entitled "A Computational Architecture for Managing the Transmittal and Render of Information, Alerts, and Notifications" Ser. No. 09/365,287, which has already been incorporated by reference (specifically, with respect to determining a probability distribution over a user's focus of attention). Thus, in one embodiment, a probability inference as to whether a user is present is determined in accordance with the description provided in this application. In another embodiment, a probability distribution over a user's focus of attention is determined.

In general, a decision should be made as to when and how to alert users to messages and to provide services (for example) based on the inference of expected criticality and user activity. In one embodiment, this decision is made as described in the cofiled, copending and coassigned application entitled "A Computational Architecture for Managing the Transmittal and Render of Information, Alerts, and Notifications" Ser. No. 09/365,287, which has already been incorporated by reference (specifically, with respect to the Notifications Decision Making module).

Figure 8:
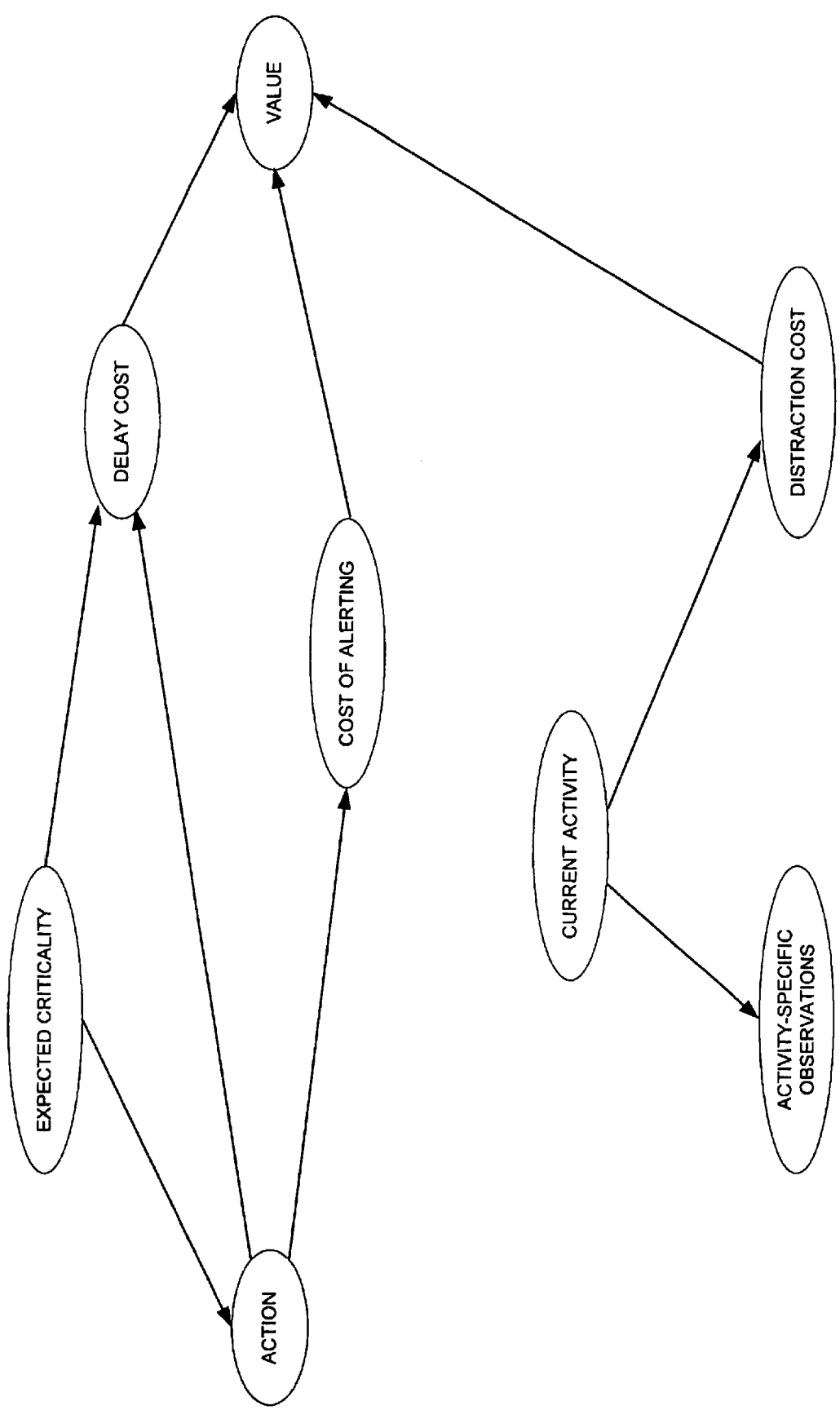
FIGS. 8–10 are influence diagrams showing how in one embodiment decision models can be utilized to make the decision as to how and when to alert a user to a message.
Figure 9:
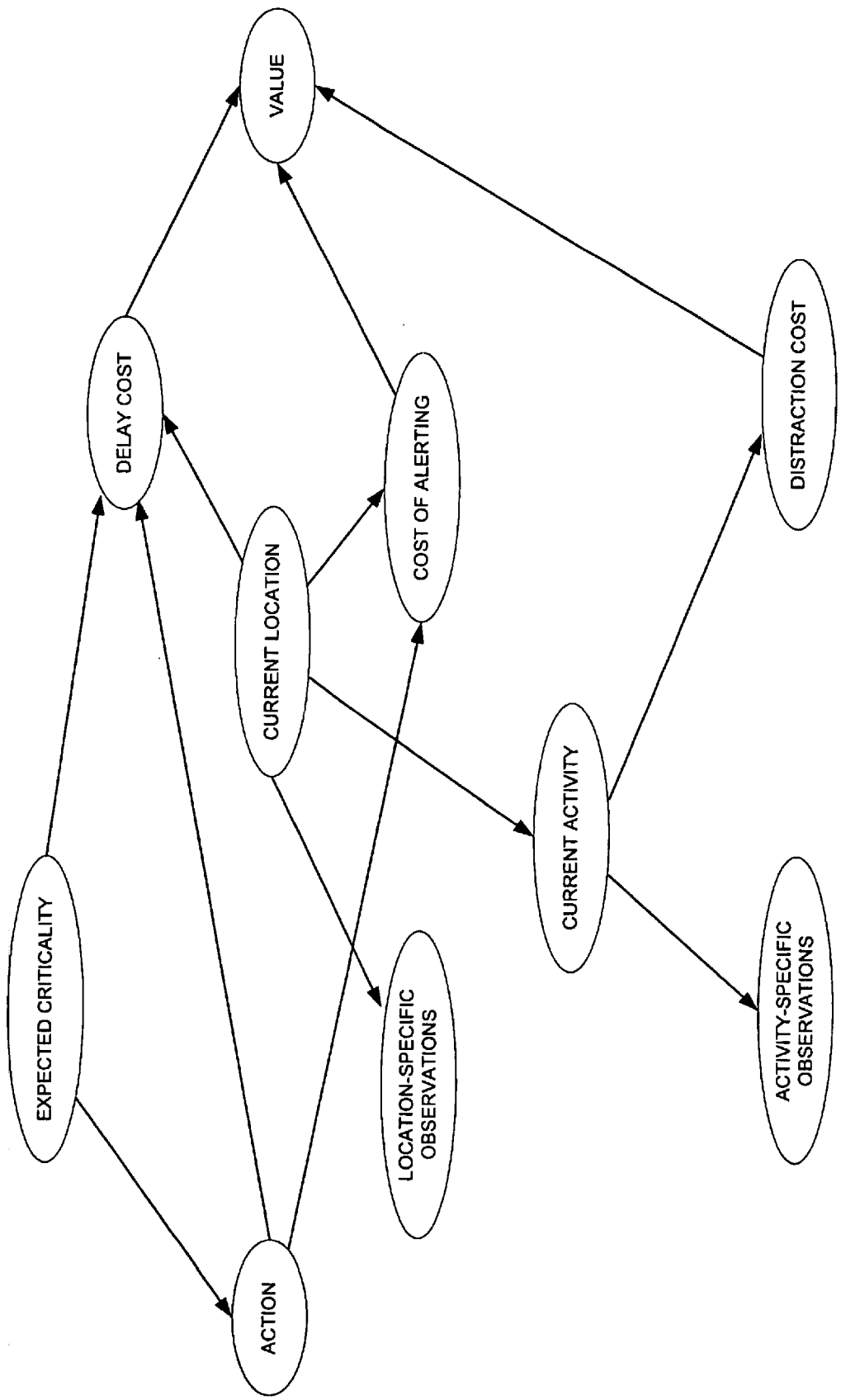
Figure 10:
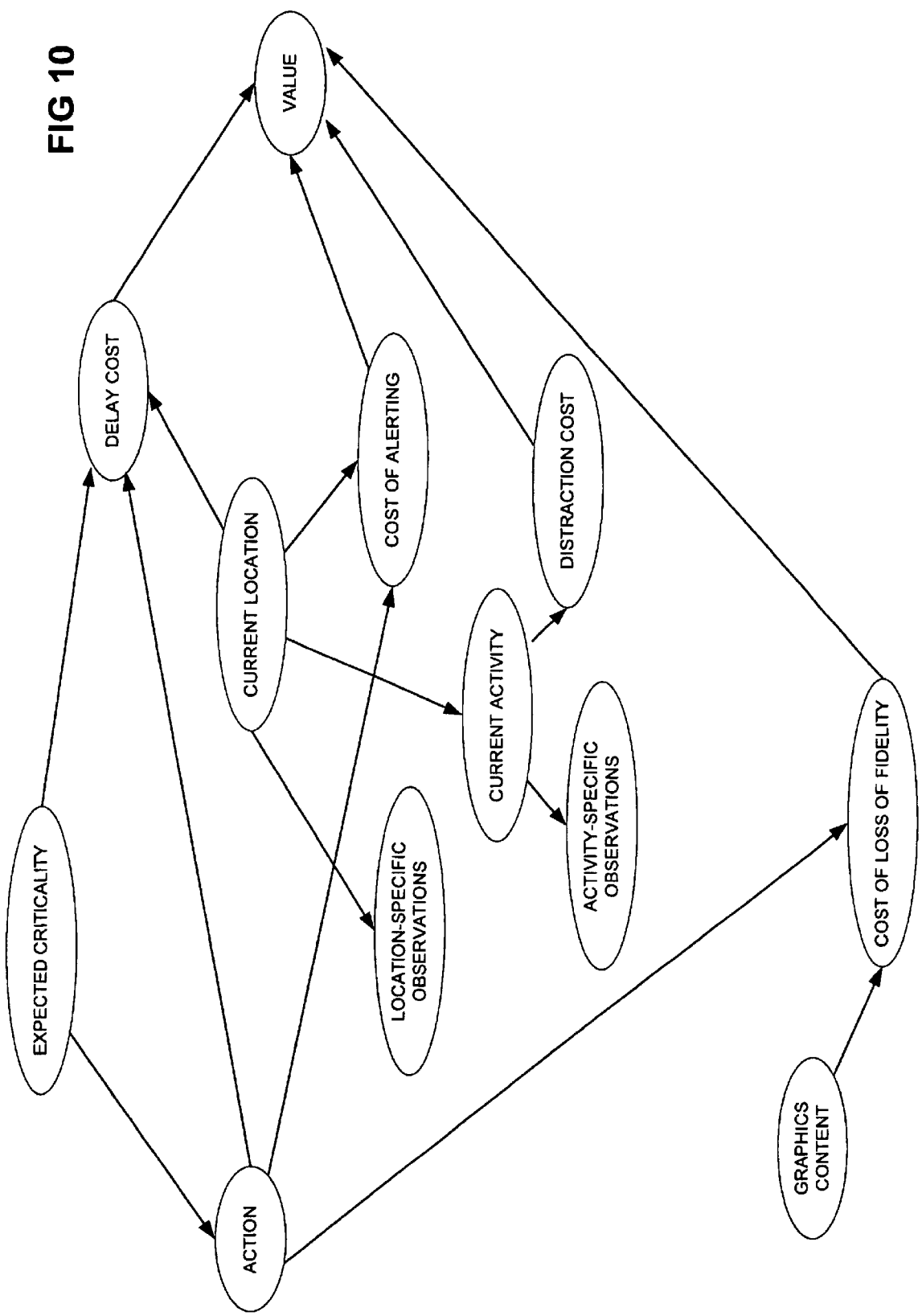

In another embodiment, this decision is made by utilizing decision models, as known within the art. FIGS. 8–10 are influence diagrams, as known within the art, showing how in one specific embodiment such decision models can be utilized to make this decision. Specifically, FIG. 8 displays a decision model for decisions about interrupting a user, considering current activity, expected time criticality of messages, and cost of alerting depending on the modality. FIG. 9 also includes variables representing the current location and the influence of that variable on activity and cost of the alternate messaging techniques. Finally, FIG. 10 is further expanded to consider the costs associated with losses in fidelity when a message with significant graphics content is forwarded to a user without the graphical content being present.

In still another embodiment, the decision as to when and how to alerts users is made by employment of a set of user-specified thresholds and parameters defining policies on alerting. In this embodiment, user presence can be inferred based on mouse or keyboard activity. Thus, a user can be allowed to input distinct thresholds on alerting for inferred states of activity and nonactivity. Users can input an amount of idle activity following activity where alerting will occur at lower criticalities. In this embodiment, if it is determined that the user is not available based on the time that no computer activity is seen—or on the user's inactivity when an attempt to alert is made—then messages and stored, and are reported to the user in order of criticality when the user returns to interact with the computer (or, returns to the room, given the availability of inputs from infrared or other presence detection).

Furthermore, in this embodiment, users can specify routing and paging options (as well as other output options) as a function of quantities including expected criticality, maximum expected loss, and value of alerting the user. Such routing, paging and other output options are more specifically described in the copending, cofiled, and coassigned applications entitled "Integration of a Computer-Based Message Priority System with Mobile Electronic Devices" Ser. No. 09/365,293, "Methods for Routing Documents based on a Measure of Criticality" Ser. No. 09/364,528, "Methods for Display, Notification, and Interaction with Prioritized Messages" Ser. No. 09/364,522, which are all hereby incorporated by reference. The invention is not so limited, however.

Method and System

In this section of the detailed description, a computer-implemented method according to an embodiment of the invention is described, and a computerized system according to an embodiment of the invention is described. With respect to the method, the method is desirably realized at least in part as one or more programs running on a computer—that is, as a program executed from a computer-readable medium such as a memory by a processor of a computer. The program is desirably storable on a machine-readable medium such as a floppy disk or a CD-ROM, for distribution and installation and execution on another computer.

Figure 11:
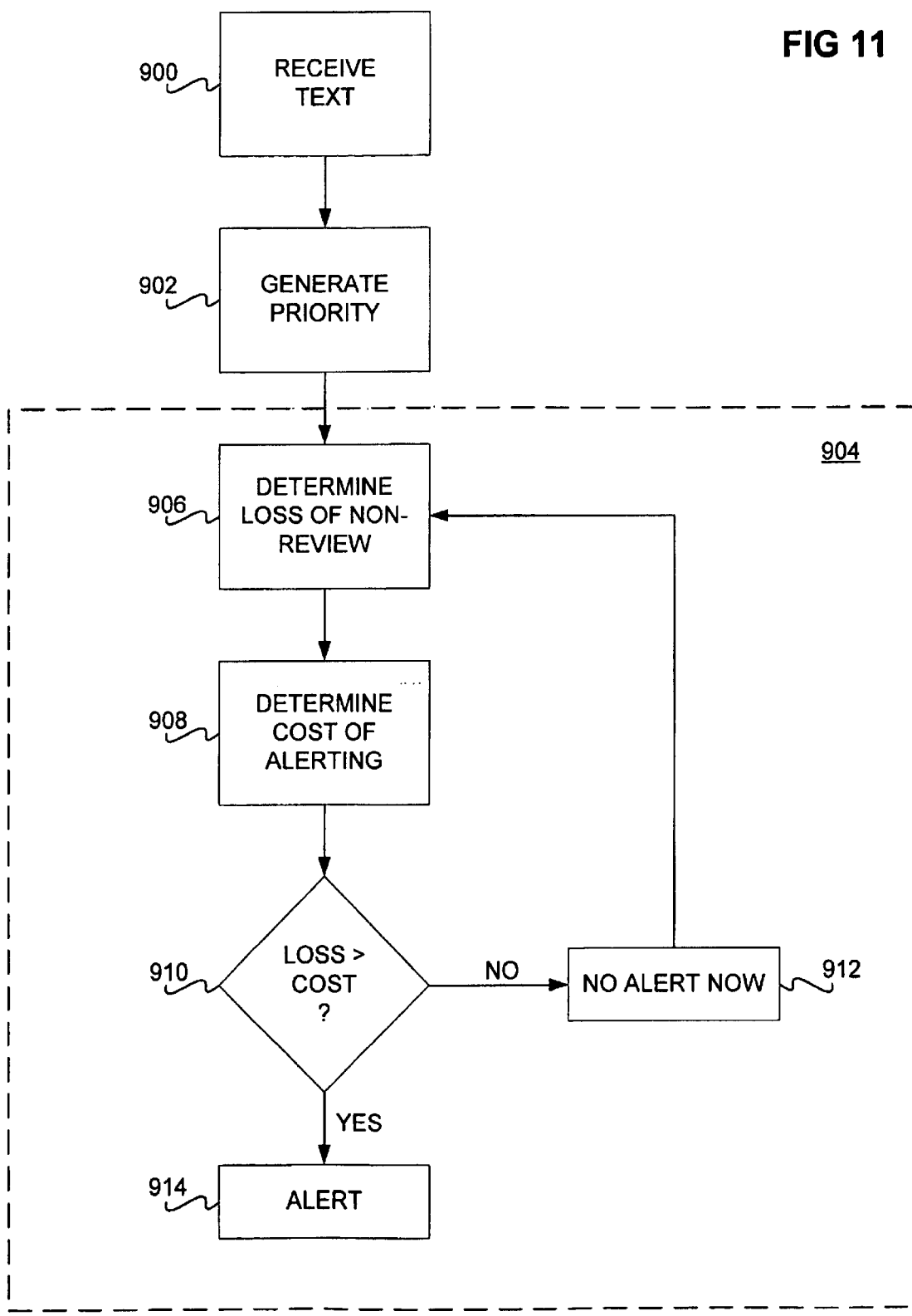
FIG. 11 is a flowchart of a method according to an embodiment of the invention; and, FIG. 12 is a diagram of a system according to an embodiment of the invention.

Referring to FIG. 11, a flowchart of a method according to an embodiment of the invention is shown. In 900, a text to have a priority thereof assigned is received. The text can be an email message, or any other type of text; the invention is not so limited. In 902, the priority of the text is generated, based on a text classifier, as has been described. Thus, in one embodiment, 902 includes initially training and continually training the text classifier, as has been described.

The priority of the text is then output in 904. In one embodiment, as indicated in FIG. 11, this can include 906, 908, 910, 912 and 914; however, the invention is not so limited. In 906, an expected loss of non-review of the text at a current time t is determined—in one embodiment, by also considering the expected loss of now-review of the text at a future time, based on the assumption that ultimately the user will review the text him or herself, without being alerted, as has been described. In 908, an expected cost of alerting is determined, as has also been described. If the loss is greater than the cost in 910, then no alert is made at the time t, and the method proceeds back to 906, to redetermine the cost-benefit analysis, at a new current time t. This is done because as time progresses, the expected loss may at some point outweigh the alert cost, such that the calculus in 910 changes. Upon the expected loss outweighing the alert cost, then an alert to the user is performed in 914, as has been described.

As has been described, the alert in 914 may be performed as described in the copending, coassigned and cofiled cases entitled "Integration of a Computer-Based Message Priority System with Mobile Electronic Devices" Ser. No. 09/365, 293, "Methods for Routing Documents based on a Measure of Criticality" Ser. No. 09/364,528, "Methods for Display, Notification, and Interaction with Prioritized Messages" Ser. No. 09/364,522, which have all already been incorporated by reference. Furthermore the outputting of the priority itself in 904 may be performed as described in these cases—that is, based only on the priority generated in 902, and without performing any cost-benefit analysis as is done in 906, 908 and 910. The invention is not limited to a particular outputting in 904, nor a particular alerting in 914, however, as can be appreciated by those of ordinary skill within the art.

Figure 12:
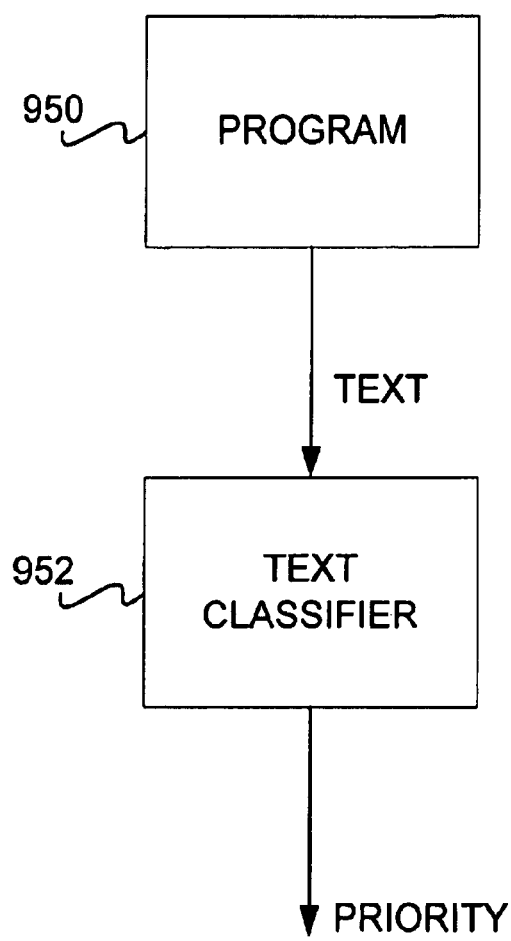

Referring next to FIG. 12, a diagram of a system according to an embodiment of the invention is shown. The system includes a program 950 and a text classifier 952. Each of the program 950 and the classifier 952 include a computer program executed by a processor of a computer from a computer-readable medium thereof, in one embodiment. However, the invention is not so limited.

The program 950 generates a text for input into the text classifier 952. In one embodiment, the program includes an electronic mail program that receives email, which then serve as the text. The text classifier 952, based on the text, generates a priority thereof, as has been described. In one embodiment, the text classifier 952 is a Bayesian text classifier, while in another embodiment, it is a Support Vector Machine classifier. The priority of the text output by the text classifier 952 can then be used in further conjunction with a cost-benefit analysis, as has been described, to effectuate further output and/or alerting based thereon, as has been described. The invention is not so limited, however.

Conclusion

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention. Therefore, it is manifestly intended that this invention be limited only by the following claims and equivalents thereof.

I claim:

1. A system for automatic prioritizing of text, comprising:

a text classifier trained to receive text and to determine a priority for each received text;

at least one storage media configured to store received text in order of priority; and an implicit training module configured to continually watch text selected by a user while working, the selected text having an assigned priority and comprising new training messages to the text classifier, such that the text classifier is updated by training in the background using the new training messages for enhancing priority decision making.

* * * * *